United States Patent [19]

Fini, Jr.

[11] Patent Number: 5,584,774
[45] Date of Patent: Dec. 17, 1996

[54] PLANETARY WEDGE DRIVE

[76] Inventor: Anthony W. Fini, Jr., 4273 Mundy St., Blasdell, N.Y. 14219

[21] Appl. No.: 397,620

[22] Filed: Mar. 2, 1995

[51] Int. Cl.$^6$ .................................................. F16H 13/06
[52] U.S. Cl. ............................................................ 475/183
[58] Field of Search ..................................... 475/183, 195

[56]  References Cited

U.S. PATENT DOCUMENTS

| Re. 19,471 | 2/1935 | Jahraus | 475/183 |
| 472,233 | 4/1892 | Osborn | 475/183 |
| 1,017,910 | 2/1912 | Rennerfelt | 475/183 |
| 1,425,172 | 8/1922 | Cameron-Cowburn | 475/183 |
| 2,578,801 | 12/1951 | Harshberger | 475/183 |
| 3,433,099 | 3/1969 | Nasvytis | 475/183 |
| 5,021,035 | 6/1991 | Zhou | 475/183 |

*Primary Examiner*—Dirk Wright

[57]  ABSTRACT

A planetary drive is made which is a friction or gear-less type of planetary drive. It includes at least three wheel members with each wheel member having circum-bevels. The wheel member shafts are parallel with one another and the wheel members have only slight bevels so that a wedging action is created between the members and together with coil spring pressure a solid driving action is created.

8 Claims, 1 Drawing Sheet

U.S. Patent
Dec. 17, 1996
5,584,774
Fig 1
Fig 2
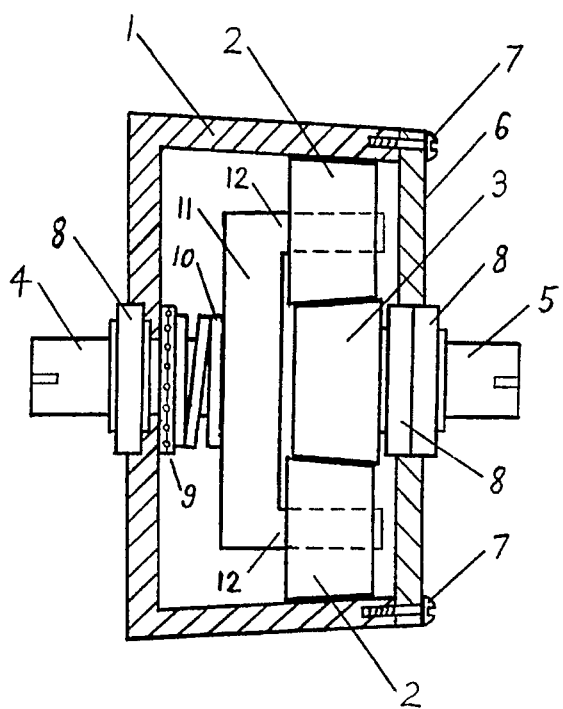
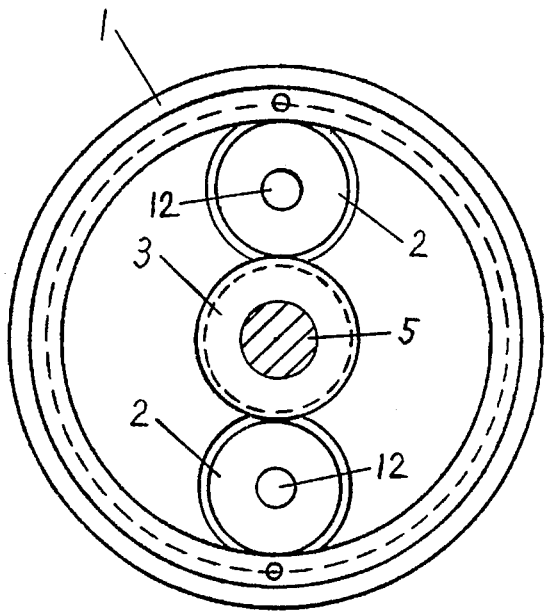

PLANETARY WEDGE DRIVE

BACKGROUND OF THE INVENTION

1. Field of the Invention

The present invention relates to a planetary drive which can be considered to be a friction or gear-less type of planetary drive.

2. Description of the Prior Art

The American Patent No. 1,017,910 discloses a type of friction planetary drive. However, the planet wheels are not beveled. Therefore it is not as efficient as it could be.

SUMMARY OF THE INVENTION

The object of the invention is to provide a planetary drive which can handle substantial amounts of speed and torque, but without gears. By having all planetary wheel members shafts parallel and having only slight tapers on the wheel members a wedging and therefore solid driving action can be created between the planetary wheel members when they are arranged with their circum-bevels contacting each other. Pressure means on the wheel members is used to maintain driving contact between the planetary wheel members.

BRIEF DESCRIPTION OF THE DRAWINGS

FIG. 1 is a side view which is partially sectioned off for open viewing of the internal workings of the invention.

FIG. 2 is a partial sectional end view and with the end cap removed.

DETAILED DESCRIPTION OF THE INVENTION

In FIGS. 1 and 2 the annulus wheel member 1 is also a casing or enclosure cover for the invention. The end cap 6 is held on by screws 7. A first shaft has a carrier 11 with pinions 12 so that the planet wheel members 2 are rotatably mounted on the pinions 12. A second shaft has a sun wheel member 3 mounted on it. Both shafts 5, 6 are supported by bearings 8 which are mounted on the enclosures end and on the end cap 6. A thrust bearing 9 accommodates the thrust load of coil spring 10.

All planetary drive wheel members 1, 2, 3 are preferably made of hardened steel for wear resistance. The circum-bevels of the wheel members 1, 2, 3 are actually exaggerated in the drawings primarily to clearly show that they are angled. However, the angle needed is very little so that there is a wedging action between the wheel members 1, 2, 3 thereby improving the driving action. Coil spring 10 provides a pressure means for all the wheel members 1, 2, 3 in this arrangement. Although two planet wheel members 2 are shown, it should be understood that only one is actually needed for function. Also the addition of more planet wheel members 2 could increase the capacity of the drive.

In operation, any one of the wheel members 1, 2, 3 could be the driver, driven, or stationary wheel member. As an example let us say we were using the invention for a portable electric drill speed reducer. In this case the annulus wheel member 1 would probably be the stationary member. The electric motor could drive the second shaft 5 and sun wheel member 3. The drill chuck would then be mounted on the first shaft 4 and would be driven by the carrier 11, pinions 12, and planet wheel members 2.

Another important advantage this type of drive has besides eliminating the trouble and cost of gears, is that it's very quiet in operation. Therefore I'm hopeful this idea will find much utility.

I claim:

1. A planetary friction drive assembly comprising a sun wheel member, a plurality of planet wheel members, a carrier member and an annulus wheel member;

said sun wheel being mounted to a first shaft for rotation about an axis of said shaft and comprising an endless circum-beveled surface;

said carrier member being mounted to a second shaft, said second shaft being rotatable around an axis in generally common alignment with said axis of said first shaft;

said planet wheel members being rotatably mounted to said carrier on axes, arranged spaced from said axes of said first and second shafts, said planet wheel members comprising an endless circum-beveled surface arranged in mating frictional engagement with said endless circum-beveled surface of said sun wheel;

said annulus wheel member being rotatably mounted and comprising an endless interior surface in frictional engagement with an endless circumferential surface of said planet wheel members;

wherein upon rotation of said carrier, said planet wheel members rotate around said endless circum-beveled surface of said sun wheel member and around their own axes.

2. A planetary drive assembly of claim 1 wherein said endless interior surface of said annulus wheel members is circum-beveled and engages an endless circum-beveled surface of said planet wheel members.

3. A planetary drive assembly of claim 1 comprising means for urging said circum-beveled surface of said planet wheel members in engagement with said circum-beveled surface of said sun wheel member.

4. A planetary drive assembly of claim 3 comprising coil spring means arranged to urge said carrier toward said sun wheel member.

5. A planetary drive of claim 1 wherein said first and second shafts are rotatably mounted to opposing sides of a housing comprising an annulus ring member arranged about perpendicular to axes of said first and second shafts.

6. A planetary drive of claim 5 wherein said annulus ring member constitutes an inside surface of a circumferential wall of said housing.

7. A planetary drive assembly of claim 1 wherein a plurality of planet wheel members are rotatably mounted in spaced arrangement on a carrier which is mounted to said second shaft, said sun member is mounted to said first shaft arranged spaced along about a common axis from said second shaft, said shafts are rotatably mounted opposite to each other in a housing, said annulus ring member constitutes a circumferential wall of said housing and a coil spring means is arranged to urge said carrier toward said sun wheel member for engaging said circum-beveled surface of said plurality of planet wheel members against said circum-beveled surface of said sun wheel member.

8. A planetary drive assembly of claim 7 wherein the inside surface of said circumferential wall of said housing is circum-beveled for engaging a circum-beveled surface of said planetary wheels.

\* \* \* \* \*